US012774065B2

(12) United States Patent
Alan

(10) Patent No.: US 12,774,065 B2
(45) Date of Patent: Oct. 27, 2026

(54) SYSTEMS AND METHODS FOR AUTOMATED PARKING VESSELS

(71) Applicant: Dasher Lawless Technologies, LLC, Warren, OH (US)

(72) Inventor: Christopher Alan, Valley Glen, CA (US)

(73) Assignee: Dasher Lawless Technologies, LLC, Warren, OH (US)

( * ) Notice: Subject to any disclaimer, the term of this patent is extended or adjusted under 35 U.S.C. 154(b) by 546 days.

(21) Appl. No.: 18/461,916

(22) Filed: Sep. 6, 2023

(65) Prior Publication Data

US 2025/0074559 A1 Mar. 6, 2025

(51) Int. Cl.

*B63C 3/06* (2006.01)
*B63C 3/02* (2006.01)

(Continued)

(52) U.S. Cl.

CPC .................. *B63C 3/06* (2013.01); *B63C 3/02* (2013.01); *B63C 3/04* (2013.01); *B65G 1/026* (2013.01);

(Continued)

(58) Field of Classification Search

None

See application file for complete search history.

(56) References Cited

U.S. PATENT DOCUMENTS 4,279,563 A 7/1981 Miller
4,953,488 A * 9/1990 Heidtmann ............. B63C 15/00 405/3

(Continued)

FOREIGN PATENT DOCUMENTS

CN 109235991 A 1/2019
CN 110246354 A 9/2019

(Continued)

OTHER PUBLICATIONS

Dasher Lawelss Technologies, LLC. Autodockit. YouTube [online], Feb. 1, 2022, [retrieved on Nov. 29, 2024]. Retrieved from the Internet: <URL:https://www.youtube.com/watch?v=SEMIWytAnKg&t=80s>.

(Continued)

*Primary Examiner* — Jacob S. Scott
*Assistant Examiner* — F Jervis
(74) *Attorney, Agent, or Firm* — Knobbe, Martens, Olson & Bear LLP

(57) ABSTRACT

Disclosed are structures, systems, and methods of transporting and storing marine vessels. An identifier of vessel positioned in a slip is read. A navigation route comprising shuttles, lifts, and a stall is generated. A first lift is used to raise the skiff pallet from the water. The vessel, positioned on the skiff pallet, is rolled from the first lift to a first shuttle. The first shuttle is used to horizontally transport the skiff pallet, with the vessel positioned thereon, through a rack storage facility entrance to a second lift at a first level, the rack storage facility comprising multiple levels. The skiff pallet, with the vessel positioned thereon, is rolled from the first shuttle to the second lift, which is used to raise the skiff pallet to a second level. The skiff pallet is rolled from the second lift to a second shuttle, and the skiff pallet, with the vessel positioned thereon, is transferred to the stall.

20 Claims, 15 Drawing Sheets

(51) Int. Cl.

| | |
|---|---|
| ***B63C 3/04*** | (2006.01) |
| ***B63C 3/08*** | (2006.01) |
| ***B63C 3/12*** | (2006.01) |
| ***B65G 1/02*** | (2006.01) |
| ***B65G 1/04*** | (2006.01) |

(52) U.S. Cl.
CPC ......... *B65G 1/0414* (2013.01); *B65G 1/0478* (2013.01); *B65G 1/0492* (2013.01); *B63C 3/08* (2013.01); *B63C 3/12* (2013.01)

(56) References Cited

U.S. PATENT DOCUMENTS

| | | | | |
|---|---|---|---|---|
| 5,049,022 | A | 9/1991 | Wilson | |
| 5,464,082 | A | 11/1995 | Young | |
| 6,007,288 | A * | 12/1999 | Maffett | B63C 15/00 414/254 |
| 6,049,745 | A | 4/2000 | Douglas et al. | |
| 6,662,077 | B2 | 12/2003 | Haag | |
| 6,851,921 | B2 | 2/2005 | Haag | |
| 7,112,007 | B2 * | 9/2006 | Maffett | B63C 15/00 405/3 |
| 7,181,409 | B1 | 2/2007 | Murakami | |
| 7,367,747 | B2 * | 5/2008 | Maffett | B63C 15/00 405/1 |
| 8,632,290 | B2 | 1/2014 | Alan | |
| 9,789,942 | B2 * | 10/2017 | Rosenberg | B63C 15/00 |
| 10,316,535 | B2 | 6/2019 | Basha | |
| 11,148,549 | B1 | 10/2021 | Alan | |
| 11,279,252 | B1 | 3/2022 | Alan | |
| 11,597,293 | B2 | 3/2023 | Alan | |
| 11,772,510 | B2 | 10/2023 | Alan | |
| 2002/0164234 | A1 | 11/2002 | Haag | |
| 2002/0176767 | A1 * | 11/2002 | Gisselberg | B66F 9/0655 414/261 |
| 2004/0083659 | A1 | 5/2004 | Duffy | |
| 2005/0035259 | A1 * | 2/2005 | Maffett | B63C 15/00 248/346.06 |
| 2006/0043176 | A1 | 3/2006 | Meyerhofer et al. | |
| 2006/0182554 | A1 * | 8/2006 | Stolzer | B63C 3/12 414/281 |
| 2006/0255119 | A1 | 11/2006 | Marchasin et al. | |
| 2007/0112620 | A1 | 5/2007 | Johnson et al. | |
| 2007/0128009 | A1 | 6/2007 | Lee | |
| 2008/0251575 | A1 | 10/2008 | Bowling et al. | |
| 2009/0026254 | A1 | 1/2009 | Johnson et al. | |
| 2009/0078172 | A1 | 3/2009 | Kaufmann et al. | |
| 2009/0148259 | A1 | 6/2009 | Shani | |
| 2009/0216876 | A1 | 8/2009 | Hsieh et al. | |
| 2011/0074350 | A1 | 3/2011 | Kocher | |
| 2011/0074351 | A1 | 3/2011 | Bianco | |
| 2011/0140658 | A1 | 6/2011 | Outwater | |
| 2011/0182703 | A1 | 7/2011 | Alan | |
| 2012/0013300 | A1 | 1/2012 | Prosser | |
| 2012/0048983 | A1 | 3/2012 | Bianco | |
| 2013/0069592 | A1 | 3/2013 | Bouman | |
| 2013/0335025 | A1 | 12/2013 | Kuribayashi | |
| 2014/0321952 | A1 | 10/2014 | Sala Branchadell | |
| 2017/0018963 | A1 | 1/2017 | Takatsu | |
| 2017/0247094 | A1 * | 8/2017 | Giroud | B66C 17/00 |
| 2019/0070970 | A1 | 3/2019 | Chan | |
| 2019/0217718 | A1 | 7/2019 | Arregui Torres | |
| 2020/0269835 | A1 | 8/2020 | Hara | |
| 2020/0298948 | A1 * | 9/2020 | Peterson | B63C 3/12 |
| 2021/0101500 | A1 | 4/2021 | Brombach | |
| 2022/0194240 | A1 | 6/2022 | Park | |
| 2023/0151628 | A1 | 5/2023 | Huch | |
| 2023/0182611 | A1 | 6/2023 | Alan | |
| 2023/0242384 | A1 | 8/2023 | Wells | |

FOREIGN PATENT DOCUMENTS

| | | | | |
|---|---|---|---|---|
| EP | 1201536 | A2 * | 5/2002 | B63C 3/06 |
| ES | 2545673 | A1 * | 9/2015 | B63C 15/00 |
| FR | 2901535 | A1 * | 11/2007 | B63C 15/00 |
| JP | 02183055 | A * | 7/1990 | |
| JP | 02241891 | A * | 9/1990 | |
| JP | H06-293405 | A | 10/1994 | |
| WO | WO-2009097342 | A2 * | 8/2009 | B63C 15/00 |
| WO | WO-2018111118 | A1 * | 6/2018 | B63C 3/12 |

OTHER PUBLICATIONS

International Search Report and Written Opinion dated Dec. 13, 2024, received in Internation Patent Application No. PCT/US2024/045432, in 10 pages.

Dasher Lawless Automation AUTOParkit found at: https://dasherlawless.com/automation/autoparkit/ printed on Apr. 20, 2021, 6 pages.

* cited by examiner

SYSTEMS AND METHODS FOR AUTOMATED PARKING VESSELS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to the parking of vessels, such as water vessels.

Description of the Related Art

Conventionally, storage of pleasure boats at or near waterways is via marina berths or dry storage.

For example, marinas conventionally provide designated berths or slips where boat owners can moor and conveniently access their vessels. These berths typically require docking facilities, such as floating docks, piers, and/or the like.

Dry storage involves storing boats on land in specially designed racks or storage facilities. These facilities are typically equipped with a forklift or crane system to lift boats in and out of the water in a labor and time intensive manner.

The use of marinas to berth vessels has many disadvantages. Marinas take up large amounts of local coastal waters. Marinas can become congested, which can make maneuvering more difficult and increases the risk of collisions or damage to boats. Further, while marinas may have limited security measures in place, boats stored in marinas are exposed to adverse weather (e.g., hurricanes, tornadoes, etc.), potential theft, vandalism, or damage from unauthorized access.

Marinas may also have significant adverse environmental impact. Building docks often involves altering the natural shoreline or constructing artificial structures in the water. This can result in the destruction or disruption of natural habitats, such as aquatic vegetation, which serve as important breeding grounds and nurseries for various species. Further, dock construction can contribute to water pollution. Fuel spills, oil leaks from engines, and improper disposal of waste from berthed vessels can contaminate the water and harm aquatic life. The construction of docks can alter natural water flows and wave patterns, potentially causing changes in the erosion and sediment deposition along the shoreline. Improperly designed or maintained docks can exacerbate erosion issues, impacting coastal stability and habitat integrity.

Dry storage also entails certain disadvantages. Dry storage facilities typically require the use of a manually operated forklift or crane to launch and retrieve boats. This means that boat owners may need to coordinate with the facility staff in advance to access their boats. In some cases, the boat may not be readily available for spontaneous outings or last-minute trips on the water. Further, the process of lifting and moving boats in and out of the water using forklifts or cranes carries the risk of accidental damage. Mishandling by facility staff or equipment malfunctions can result in scratches, dents, or other damage to the boat's hull or other components.

Thus, what is needed are methods and systems that address some or all of the forgoing deficits of conventional approaches to vessel storage.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to structures, systems, and methods of transporting and storing marine vessels. An identifier of vessel positioned in a slip is read. A navigation route comprising shuttles, lifts, and a stall is generated. A first lift is used to raise the skiff pallet from the water. The vessel, positioned on the skiff pallet, is rolled from the first lift to a first shuttle. The first shuttle is used to horizontally transport the skiff pallet, with the vessel positioned thereon, through a rack storage facility entrance to a second lift at a first level, the rack storage facility comprising multiple levels. The skiff pallet, with the vessel positioned thereon, is rolled from the first shuttle to the second lift, which is used to raise the skiff pallet to a second level. The skiff pallet is rolled from the second lift to a second shuttle, and the skiff pallet, An aspect of the present disclosure relates to a system, comprising: at least one processing device; non-transitory memory that stores programmatic instructions that when executed by the at least one processing device cause the system to perform operations comprising: determining that a marine vessel is positioned in a slip; optically or electronically reading an identifier on the marine vessel; using the identifier to access data stored in memory corresponding to the marine vessel; based at least in part on the accessed data, selecting a storage stall; generating a navigation route comprising a plurality of shuttles, configured to horizontally transport pallets via lanes, and a plurality of lifts configured to vertically transport pallets; causing the marine vessel to be positioned on a pallet located in water; causing a first lift to raise the skiff pallet from the water, with the marine vessel positioned on a pallet cradle; causing the skiff pallet, with the marine vessel positioned on the skiff pallet cradle, to be rolled from the first lift to a first shuttle, in accordance with the navigation route; causing the first shuttle to horizontally transport, on a first conveyor system, the skiff pallet, with the marine vessel positioned on the skiff pallet cradle, through an entryway of a rack structure facility to a second lift at a first level, the rack storage facility comprising a building with multiple levels of storage stalls therein, wherein a given level comprises one or more lanes positioned adjacent to at least one row of storage stalls; causing the skiff pallet, with the marine vessel positioned on the skiff pallet cradle, to be rolled from the first shuttle to the second lift; using the second lift to raise the skiff pallet, with the marine vessel positioned on the skiff pallet cradle, to a second level; causing the skiff pallet, with the marine vessel positioned on the skiff pallet cradle, to be rolled from the second lift to a second shuttle; causing the second shuttle to horizontally transport, on a second conveyor system at the second level, the skiff pallet, with the marine vessel positioned on the skiff pallet cradle, to the storage stall.

Optionally, the identifier on the marine vessel is encoded in an optical code. Optionally, the first conveyor system comprises a rail-based transport system. Optionally, the skiff pallet comprises an open grate structure. Optionally, the operations further comprise: receiving an electronic request for retrieval of a second marine vessel, the request comprising an identifier associated with a user and/or second marine vessel; accessing a record indicating a storage stall at which the second marine vessel is stored; selecting a dock slip at which the second marine vessel is to be deployed; generating a navigation route from the storage stall at which the second marine vessel is stored to the selected dock slip, the navigation route comprising at least one lift and at least one shuttle; transporting the second marine vessel from the storage stall at which the second marine vessel to the selected dock slip in accordance with the generated navigation route from the storage stall at which the second marine vessel is stored to the selected dock slip. Optionally, the operations further comprise using a plurality of positioning arms positioned on either side of the marine vessel to position the marine vessel on the skiff pallet located in water. Optionally, the building comprises anchor bolts and/or tie-down straps to secure the building to a foundation, reinforced concrete walls and/or a steel frame configured to resist uplift and damage from a hurricane. Optionally, a first level comprises at least two lanes of different widths configured for different width marine vessels. Optionally, the storage stall is selected based at least in part on size information related to the marine vessel. Optionally, the navigation route is generated using size information related to the marine vessel.

An aspect of the present disclosure relates to a computer implemented method, the method comprising: determining that a marine vessel is positioned in a slip; optically or electronically reading an identifier on the marine vessel; using the identifier to access data stored in memory corresponding to the marine vessel; based at least in part on the accessed data, selecting a storage stall; generating a navigation route comprising one or more shuttles, configured to horizontally transport pallets, and one or more lifts configured to vertically transport pallets; causing the marine vessel to be positioned on a pallet located in water; causing a first lift to raise the skiff pallet from the water, with the marine vessel positioned on a pallet cradle; causing the skiff pallet, with the marine vessel positioned on the skiff pallet cradle, to be transferred from the first lift to a first shuttle, in accordance with the navigation route; causing the first shuttle to horizontally transport, on a first conveyor system, the skiff pallet, with the marine vessel positioned on the skiff pallet cradle, through an entryway of a rack structure facility to a second lift at a first level, the rack storage facility comprising a building with multiple levels of storage stalls therein, wherein a given level comprises one or more lanes positioned adjacent to at least one row of storage stalls; and causing the skiff pallet, with the marine vessel positioned on the skiff pallet cradle, to transported to the storage stall.

Optionally, the identifier on the marine vessel is encoded in an optical code. Optionally, the first conveyor system comprises a rail-based transport system. Optionally, the skiff pallet comprises an open grate structure. Optionally, the method further comprises: receiving an electronic request for retrieval of a second marine vessel, the request comprising an identifier associated with a user and/or second marine vessel; accessing a record indicating a storage stall at which the second marine vessel is stored; selecting a dock slip at which the second marine vessel is to be deployed; generating a navigation route from the storage stall at which the second marine vessel is stored to the selected dock slip, the navigation route comprising at least one lift and at least one shuttle; transporting the second marine vessel from the storage stall at which the second marine vessel to the selected dock slip in accordance with the generated navigation route from the storage stall at which the second marine vessel is stored to the selected dock slip. Optionally, the method further comprises using a plurality of positioning arms positioned on either side of the marine vessel to position the marine vessel on the skiff pallet located in water. Optionally, a first level comprises at least two lanes of different widths configured for different width marine vessels, and the generated navigation route is generated to select a lane wide enough for the marine vessel. Optionally, the storage stall is selected based at least in part on size information related to the marine vessel. Optionally, the navigation route is generated using size information related to the marine vessel. Optionally, causing the skiff pallet, with the marine vessel positioned on the skiff pallet cradle, to be transferred from the first lift to the first shuttle, further comprising causing the skiff pallet to be rolled from the first lift to the first shuttle. with the vessel positioned thereon, is transferred to the stall.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1A:
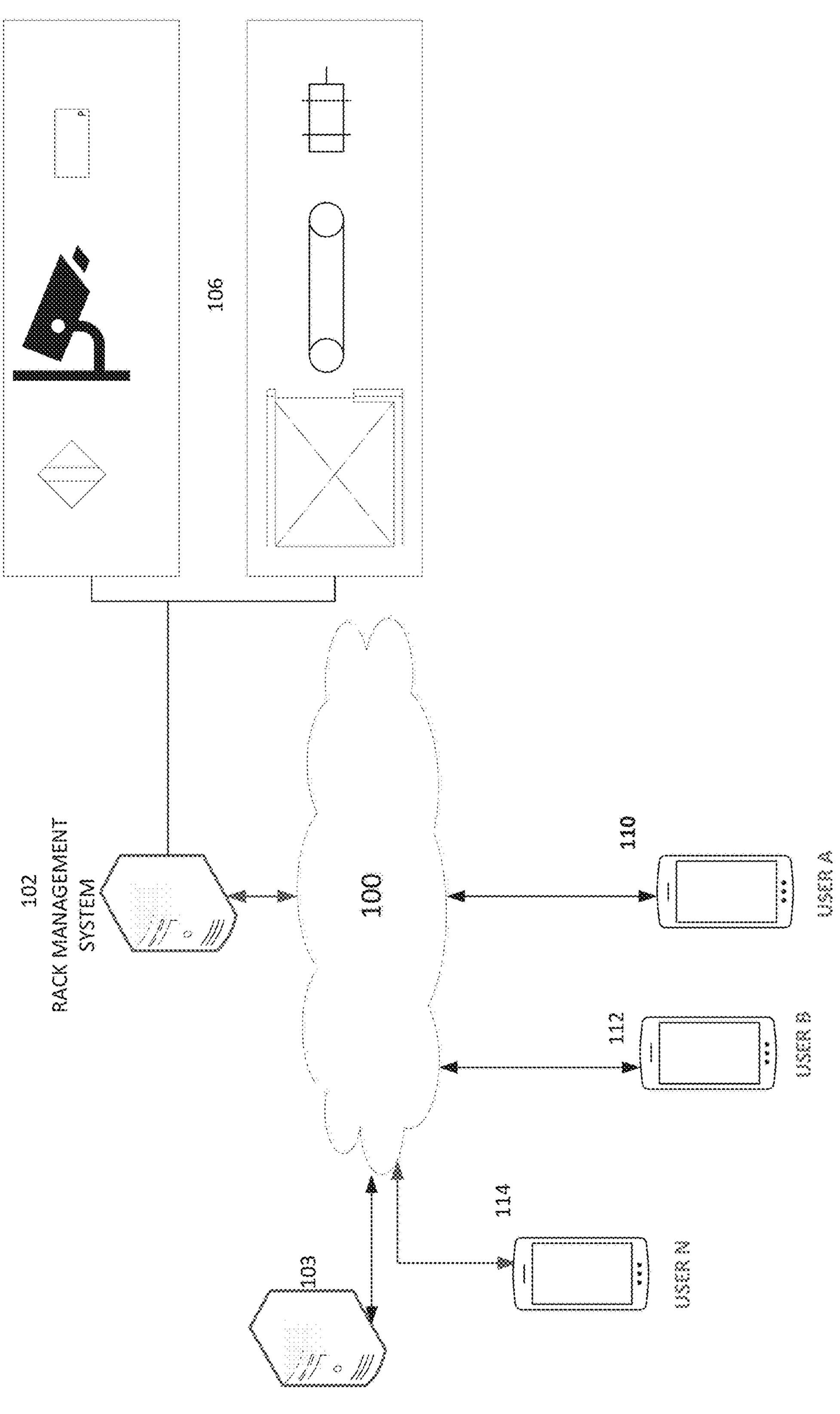
FIG. 1A illustrates an example operating environment.

An aspect of the present disclosure relates to systems and methods configured to extract vessels, such as marine vessels (e.g., motorboats, sailboats, multi-hull vessels, etc.), from water, and store the vessels in a protective structure. Advantageously, the disclosed techniques do not suffer many of the drawbacks of conventional approaches, and advantageously have reduced physical and environmental footprints, provide much quicker access to stored vessels, and more careful and secure handling of marine vessels, as compared to conventional systems.

An aspect of the present disclosure relates to an automated marine vessel storage system that enables increased marine vessel storage capacity on a reduced land footprint. Optionally, the marine vessels may be safely stored indoors on a dry slip (which may be referred to as a stall or slot) in a multistory rack structure. The rack may comprise a plurality of vertically disposed levels with one or more rows of stalls and may comprise lifts for vertical transport of marine vessels to a desired rack level and may further comprise shuttles for horizontal transport of a marine vessel at a given level (e.g., to a target storage space) through transport lanes (which may be positioned, at least in part, between and adjacent two rows of storage stalls, or adjacent to single row of storage stalls). The lifts and shuttles may be controlled by a computer system, such as a computerized industrial automation system. Optionally, there may be different widths for different transport lanes on one or more levels (e.g., to accommodate different widths of marine vessels).

The computerized industrial automation system may include programmable logic controllers (PLCs), motor drives, sensors, and/or human-machine interfaces (HMIs). The motor drives may be used to regulate the speed, direction, and torque of the motors based on signals received from the PLCs. The motors may be used to move the lifts and shuttles (e.g., via a conveyor system, such as a conveyor rail, other rail-based system, or a belt system), transfer vessels from one shuttle to another shuttle or to a lift, transfer vessels from a lift to a shuttle, and open and close automated doors.

The sensors may include vision systems (e.g., comprising cameras, such as motion activated cameras, LIDAR (Light Detection and Ranging) sensors, and/or the like), pressure sensors, proximity sensors (e.g., mechanical sensors, inductive proximity sensors, capacitive proximity sensors, photoelectric sensors, ultrasonic sensors, LIDAR sensors), temperature sensors, force and load sensors, vibration and motion sensors, humidity sensors, limit switches, occupancy detectors, and/or the like. For example, proximity sensors may be utilized to detect the presence or absence of objects, such as marine vessels, lifts, shuttles, and/or the like. Force and load sensors may be used to measure the presence and/or weight of a marine vessel on a skiff pallet, lift or shuttle, and/or the force and/or load being exerted at various points of the rack. Vision sensor systems may be utilized to inspect and analyze visual information, such as the presence, type, and/or size of a marine vessel, and the movement of marine vessels, lifts, and shuttles. Redundant sensors may be provided for one or more of the foregoing sensor types to enhance safety. The sensors may be utilized to ensure that an attempt is not made to lift a marine vessel from the water if there is not a skiff pallet positioned beneath the marine vessel (where a sensor may detect the absence of a skiff pallet). In addition, the sensors may be utilized to ensure that an attempt is not made to store a marine vessel at a location that already has a marine vessel stored thereon (where a sensor may detect the presence of a marine vessel at a given location).

The human-machine interfaces may provide a mechanism for operators and maintenance personnel to interact with the computerized automation system. The human-machine interfaces may be displayed via a terminal (e.g., as graphical user interfaces). The HMIs typically may comprise graphical and/or textual displays (e.g., touchscreens) that present real-time information about the vessels, pallets, lifts and shuttles, enable operators to issue commands (e.g., via a touchscreen, a physical keyboard, using verbal commands provided via a microphone, or otherwise), and provide diagnostic and troubleshooting tools. For example, the HMI may show, via a model of the automated marine vessel storage system, the current location and/or movements of marine vessels, lifts, and shuttles and may identify problems visually and/or textual (e.g., failed motors, sensors, jammed lifts or conveyors, etc.). The HMI may further display real time and/or recorded video from one or more cameras or LIDARs, and/or various data from the sensors. The HMI may show which marine vessels are currently located at which storage slips, which marine vessels are scheduled to be retrieved (and when), which dock slips are occupied, which dock slips are reserved from an incoming marine vessel, and/or the like.

The computerized automation system may be programmed using programming languages such as LADDER LOGIC, structured text, and/or function block diagrams (e.g., to create control algorithms that define the behavior and operation of the system). The control algorithms may be configured to handle different aspects of lift and shuttle operations, such as speed control, position control, safety interlocks, fault detection, and/or emergency stop mechanisms. Optionally, such algorithms are programmed into the PLCs and govern the behavior of the system based on input signals from sensors and/or commands from the operator.

The PLCs, sensors, motor drives, terminals, and/or other devices may be coupled to one or more networks to communicate commands and data.

Optionally, the rack structure is configured as a hurricane-resistant building to protect the stored vessels. For example, the building may be configured to withstand high wind loads by incorporating robust structural systems, such as reinforced concrete and/or steel frames that are engineered to withstand the forces exerted by strong winds. The roof may be metal or comprise a reinforced membrane due to their strength and resistance to wind uplift and may be securely fastened to the building's frame. The building windows and doors may be configured to be impact-resistant to protect the building against wind-borne debris during hurricanes. For example, the windows and doors may be constructed with laminated glass and/or reinforced materials that are capable of withstanding impact from flying objects to help prevent damage to the building's interior and maintain its structural integrity. The exterior walls may be reinforced to withstand the forces exerted by strong winds using reinforced concrete or concrete block construction. Other reinforcement techniques, such as reinforcing steel bars (rebar) or mesh, may optionally help enhance the structural integrity of the walls. In addition, anchor bolts, tie-down straps, and/or the like may be used to secure the building to the foundation to resist uplift and lateral forces.

By way of illustration, a marine vessel may be manually piloted to a dock slip. There may be multiple slips of different widths and/or lengths to accommodate different sizes of marine vessels. The marine vessel may be centered in the slip using a positioning mechanism, such as foam or rubber rollers positioned on multiple arms on either side of the marine vessel. For example, there may be two arms with vertically oriented rollers on either side of the front of the slip (to center the front/bow of the marine vessel) and there may be two arms with vertically oriented rollers on either side of the rear of the slip (to center the back/stern of the marine vessel). There may be additional arms to center the vessel between the front arms and the rear arms.

Optionally, prior to the marine vessel arriving at the slip, a skiff pallet, narrower than the width of the slip may have been positioned under water beneath the slip. Different size slips may have correspondingly different sized skiff pallets (e.g., having different widths and/or lengths) configured for different marine vessel weights. Once the marine vessel is positioned and centered in the slip above the skiff pallet, the skiff pallet, with the marine vessel thereon, may be lifted out of the water via a motorized dock lift, where the skiff pallet comprises a marine vessel cradle to hold the marine vessel securely without damaging the marine vessel.

The vessel cradle may include a support structure (e.g., steel or aluminum frames welded or bolted to crossbars of the skiff pallet) comprising pairs (e.g., one or two pairs) of long, padded supports (e.g., elevated pontoons) configured to provide a resting surface for either side of the marine vessel's hull, distributing its weight evenly and reducing stress during transportation through the rack structure. The padding may be made of carpeted or rubberized material to protect the hull of the marine vessel. The cradle support structures may be positioned parallel to a frame of the skiff pallet and may extend horizontally from the front to the rear of the skiff pallet. Optionally, the cradle may be adjustable in height and width to accommodate marine vessels of different sizes and shapes. Optionally, different skiff pallets, shuttles, and/or lifts may have cradles of different heights, widths, and/or lengths to accommodate marine vessels of different size (e.g., length, width, height, etc.) and shape.

Optionally, the cradle may be mounted to (e.g., welded to) a wishbone shaped metal structure mounted to a skiff pallet base. The wishbone shaped metal structure may comprise a central point where the three branches of the wishbone meet, two of which extend outward in a curved and symmetrical manner towards and mounted to the rear of the pallet base, and the forward branch extending to and mounted to the front of the pallet base. The front of the vessel may be oriented so that the bow of the vessel points towards the front of the skiff pallet base, and the stern of the vessel points towards the rear of the skiff pallet base. The skiff pallet base may comprise an open grate enabling water to drip therethrough. The skiff pallet base may optionally include rotatable wheels and/or channels configured to receive wheels rotatably mounted to shuttles and/or lifts to enable the skiff pallet to be conveyed to or from (e.g., rolled on or off of) shuttles and lifts. Optionally, the skiff pallet does not include wheels.

The skiff pallet, with the marine vessel cradled thereon, may then automatically rolled onto a shuttle (e.g., using a liner motor) and may be horizontally transported (via a motorized conveyor system (e.g., a rail system)) to a given location within the structure. The shuttle may comprise a rectangular structure with reinforcing x-beams comprising two metal beams extending diagonally from corner to corner. A reinforcing crossbeam may be positioned midway across the rectangular structure. The lift base may optionally have a similar structure.

The skiff pallet may be automatically conveyed (e.g., rolled) onto a lift, which may raise (or lower) the skiff pallet, with the marine vessel thereon, to a desired level. The skiff pallet may then be automatically rolled onto another shuttle, which may be transported via a motorized conveyor system to a desired location on the current level (which may be on either side of the conveyor system). The skiff pallet, with the marine vessel cradled thereon, may then be conveyed to (e.g., rolled onto) a storage location (which may be referred to herein as a stall) on either side of the conveyor system. The skiff pallet may then remain at the stall until the marine vessel is being retrieved (e.g., for the owner) or needs to be moved to park marine vessels more efficiently. The skiff pallet may include tube rails mounted to its underside, which may rest on a conveyor or lift roller during transport. A motor, such as a linear drive, may be used to roll the skiff pallet on and off of the conveyor or lift rollers. Optionally, during the transport from the dock slip to the storage location, the marine vessel never leaves the skiff pallet.

Optionally, prior to transporting the marine vessel from the dock area or prior to vertically lifting the marine vessel within the rack structure for storage, the marine vessel may be automatically washed using fresh water (e.g., via spray nozzles). Fresh water, as used herein, may comprise gray water. Optionally, the system may detect via one or more of the sensors discussed herein, whether the marine vessel has a top, and if so, the system may automatically use fresh water to wash the top. The rack structure may include a buffer area to temporarily store marine vessels in the event that an appropriate stall is not available to receive the marine vessel or to provide for manual washing of the vessel. Then, once an appropriately sized stall is available, the system may transport the marine vessel to the stall.

The motion of the marine vessel, pallets, lifts, and shuttles may be tracked (e.g., via sensors, such as motion activated cameras, LIDAR sensors, photoelectric sensors, proximity sensors, limit switches, occupancy detectors, current sensors, voltage sensors, pressure sensors, level sensors, temperature sensors, reed switches, other sensors disclosed herein, and/or other sensors) by the computerized industrial automation system (e.g., by the programmable logic controller(s)) so that their respective locations (including the storage location of the marine vessel) at any given moment are known. Optionally, an identifier may be present on the marine vessel that may be detected by the sensors so the computerized industrial automation system may further verify which marine vessel is being transported and the transport path and current location of the marine vessel is known. Optionally, if the data from sensors indicate that the marine vessel is not where the computerized industrial automation system expects it (e.g., based on a transport route generated by the automation system), an error alert may be generated and the rack may be placed into a safe mode (e.g., with the lifts and shuttles taken out of service/turned off). The error alert may cause visual indicators (e.g., emergency lights) to be lit and/or an audible alarm to be emitted via a speaker or other sound emitter. Optionally, an electronic communication, such as a text message, email, or application alert may be generated and transmitted to one or more destinations (e.g., operator personnel). Optionally, the electronic communication may indicate the cause that triggered the alert (e.g., missing marine vessel, marine vessel misrouted, etc.).

Optionally, the identifier may comprise a computer readable code, such as a barcode (e.g., a one dimensional or two dimensional barcode, such as a QR code) that encodes an alphanumeric or other identifier that uniquely identifies the marine vessel. By way of further example, the identifier may be stored in an RFID tag that may be read via RFID readers placed at various locations along marine vessel transport lanes and/or on lifts. The identifier read from the marine vessel may be compared against those stored in user account records to locate a matching account record. The user account record may include the unique identifier, a user name, a marine vessel type (e.g., motor, sail, multihull, etc.), marine vessel dimensions (e.g., width, length, height) and/or or a corresponding size classification (e.g., Class 1, Class 2, Class 3, etc.), marine vessel weight, user authentication data (e.g., a UserID, a password, etc.), user contact information (e.g., mobile phone number, email address, etc.), payment information (e.g., a credit card number, a bank account, etc.), historical vessel retrieval and storage data (e.g., the dates and times the user requested a retrieval or storage of the marine vessel), current storage location (e.g., the rack structure address or other identifier, and a stall identifier (e.g., an alphanumeric identifier)), other user and vessel data disclosed herein, and/or the like. With respect to an example size classification, Class 1 may correspond to 16-26 feet in length, Class 2 may correspond to 27-40 feet in length, Class 3 may correspond to 41-65 feet in length, etc.

Optionally, if a user wants to retrieve their marine vessel, they can request the marine vessel via user interface presented by an application (an "app") downloaded to a user device (e.g., a smart phone, a wearable device such as a smart watch, a tablet computer, a laptop computer, a desktop computer, a smart television, a game console, etc.) or via a webpage. Optionally, the user may request the marine vessel ahead of time via an interactive response system or via a live call. The request may include user and/or marine vessel identifiers, and a specific date and time for which the marine vessel is requested, or an as soon as possible request. The computerized industrial automation system may the estimate how long it will take to retrieve the marine vessel at the requested date and time and may then begin the marine vessel retrieval based on the estimated time so that the marine vessel will be in the water and available to the user at the requested date and time (or within a threshold period of time before or after the requested time). The retrieval process may be performed very quickly (e.g., an average retrieval time of 3-6 minutes). Optionally, if the user is requesting substantially immediate provision of a marine vessel, the system may calculate the approximate amount of time it will take to retrieve the marine vessel and transmit the time estimate to the user (e.g., via a text message, an email, and/or via the application or webpage used to provide the request). Optionally, the computerized industrial automation system may determine (e.g., based on the size of the marine vessel as retrieved from the user account record, the sizes of the dock slips, and/or the availability of the dock slips) to which dock slip the marine vessel will be deployed and may provide a dock slip identification to the user (e.g., via the same communication as the time estimate is provided or via a separate communication). For example, the dock slip identification may include an alphanumeric identifier (e.g., slip 1) and/or a slip location (e.g., the third slip from the left).

Optionally, the rack system may be configured to retrieve multiple marine vessels at the same time (e.g., using multiple lifts and shuttles). The disclosed architecture optionally includes multiple transport lanes (which may be referred to as shuffle lanes, and which may comprise lanes of different widths to accommodate different sizes of marine vessels) at a given level and enables independent movement of pallets (and marine vessels thereon) at each level of the rack structure so multiple marine vessels can be in transition simultaneously (for storage or retrieval). The multiple shuffle lanes, lifts, and shuttles may service multiple dock lifts for respective slips.

Optionally, if a slip is empty, the lift for the empty slip is positioned out of the water in preparation to receive the next marine vessel and to lower the marine vessel into water. Optionally instead, or if there is no pending request for use of the slip for a period of time, the empty pallet is returned to a rack storage area.

Thus, marine vessels may be stored and retrieved without requiring a human to touch the marine vessel, or a forklift or overhead crane to move the marine vessel (although such may be utilized). Further, the disclosed rack system reduces or eliminates the opportunity for human error that could damage or misplace the marine vessel.

Optionally, the rack system may be configured to predict which marine vessels will be requested when. For example, the rack system's computerized industrial automation system may access historical retrieval dates and times (e.g., from the user account record), the frequency of retrieval, the current date, the current time, the current or predicted whether, and determine a likelihood as to when a marine vessel may be requested. In anticipation of such request, the computerized industrial automation system may rearrange the storage locations of various marine vessels so that those marine vessels that are predicted to be requested in a given time frame are positioned at a storage location such that the retrieval time will be reduced. For example, the storage location may be selected by the automation system such that no more than two or three movement transactions (e.g., one vertical transport via a lift, and one horizontal transport via a shuttle) are needed to transport the marine vessel to a dock slip.

Referring now to FIG. 1A, an architecture is illustrated that may be utilized to transport vessels, such as pleasure marine vessels or fishing craft, to and from, and within a multilevel storage structure, such as the rack structure described herein. The various systems and devices may communicate with each other over one or wired and/or wireless networks. For example, network 100 (e.g., the Internet, Ethernet, or other wide area or local area network) may be utilized to enable a rack management system 102 to communicate with user devices 110, 112, 114, and optionally a data collection system 103. In addition, the rack management system 102 may receive various data over a bus from sensors 104. By way of example, the sensors 104 may include vision systems (e.g., comprising cameras, such as motion activated cameras, LIDAR sensors, and/or the like), pressure sensors, proximity sensors (e.g., cameras, LIDAR sensors, mechanical sensors, inductive proximity sensors, capacitive proximity sensors, photoelectric sensors, ultrasonic sensors, LIDAR sensors), temperature sensors, force and load sensors, vibration and motion sensors, humidity sensors, barcode readers, RFID readers, and/or the like. The sensor data may be used by the rack management system 102 in controlling various transport and other mechanisms 106 of the rack structure, such as lifts, conveyor systems, and/or other motorized systems (e.g., motorized doors, such as overhead doors and human access doors).

A data collection system 103 may optionally be connected to one or more remote rack management systems. The data collection system 103 may collect data from the rack management systems, such as some or all the sensor data collected by the rack management systems and/or some or all of the commands issued to or by the rack management system, and actions taken by the rack management systems. The data may include identifiers associated with users whose vessels were stored and/or retrieved within a given period of time (e.g., the last 24 hours, the last week, the last month, etc.) and/or were cleaned, and/or the like.

The data collection system 103 may use such storage and retrieval-related data to determine how much a given user is to be invoiced for such services, and the invoice may be electrically transmitted to the user (e.g., via email, text message, website, etc.), and/or a user's payment instrument may be correspondingly charged.

In the illustrated embodiment, the data collection system 103 may be hosted on one or more servers. The data collection system 103 may be cloud-based and may be accessed by one or more user devices 110, 112 over the network 100.

User devices 110, 112, 114, rack management system 102, and data collection system 103 may be configured to share software applications, computing resources, and data storage.

Optionally, a software application configured to interact with the rack management system 102 may be downloaded from the rack management system 102 and/or an application store to one or more of the user devices 110, 112, 114. Optionally, functionality provided by the software application may be instead or in addition be accessed via a web browser hosted on a user device from a remote web server. The software application may optionally enable a user to request that a vessel be retrieved or washed, to receive retrieval time estimates and an identification of the dock slip at which the user may access the vessel from the rack management system 102, and/or the like.

The user devices 110, 112, 114 may be in the form of a desktop computer, laptop computer, tablet computer, mobile phone, smart television, smart wearable device (e.g., a smart watch, smart eyeglasses, etc.), cloud-based system, a system mounted in a user vessel, and/or other computing system. A user device may include user input and output devices, such displays (touch or non-touch displays), speakers, microphones (e.g., to accept voice commands or to enable voice calls), trackpads, mice, pen input, printers, haptic feedback devices, cameras, and/or the like. A user device may include wireless and/or wired network interfaces (e.g., Bluetooth, Wi-Fi, and/or other network interfaces) via which the user may communicate with the rack management system 102, the data collection system 103, and/or other systems and devices over one or more networks.

User interfaces described herein are optionally configured to present data (optionally in real time) from sources described herein and to receive user data and commands (e.g., retrieval requests, storage requests, wash requests, and/or the like), which may optionally be executed by the rack management system 102 (and/or other systems described herein), optionally in real time. Certain commands may be executed at a delayed time, such as a vessel retrieval request associated with a requested future date and/or time.

Optionally, a version of the user interfaces described herein may be enhanced for use with a small touch screen (e.g., 1 to 13 inches diagonal), such as that of a mobile phone, a tablet computer, a smart watch, or a vessel dash display. For example, the orientation of the controls may be relatively more vertical rather than horizontal to reflect the height/width ratio of typical mobile device displays and certain vessel displays. Further, the user interfaces may utilize contextual controls that are displayed in response to an inferred user desire, rather than displaying a large number of tiny controls at the same time (which would make such small controls difficult to select or manipulate using a finger).

Figure 1B:
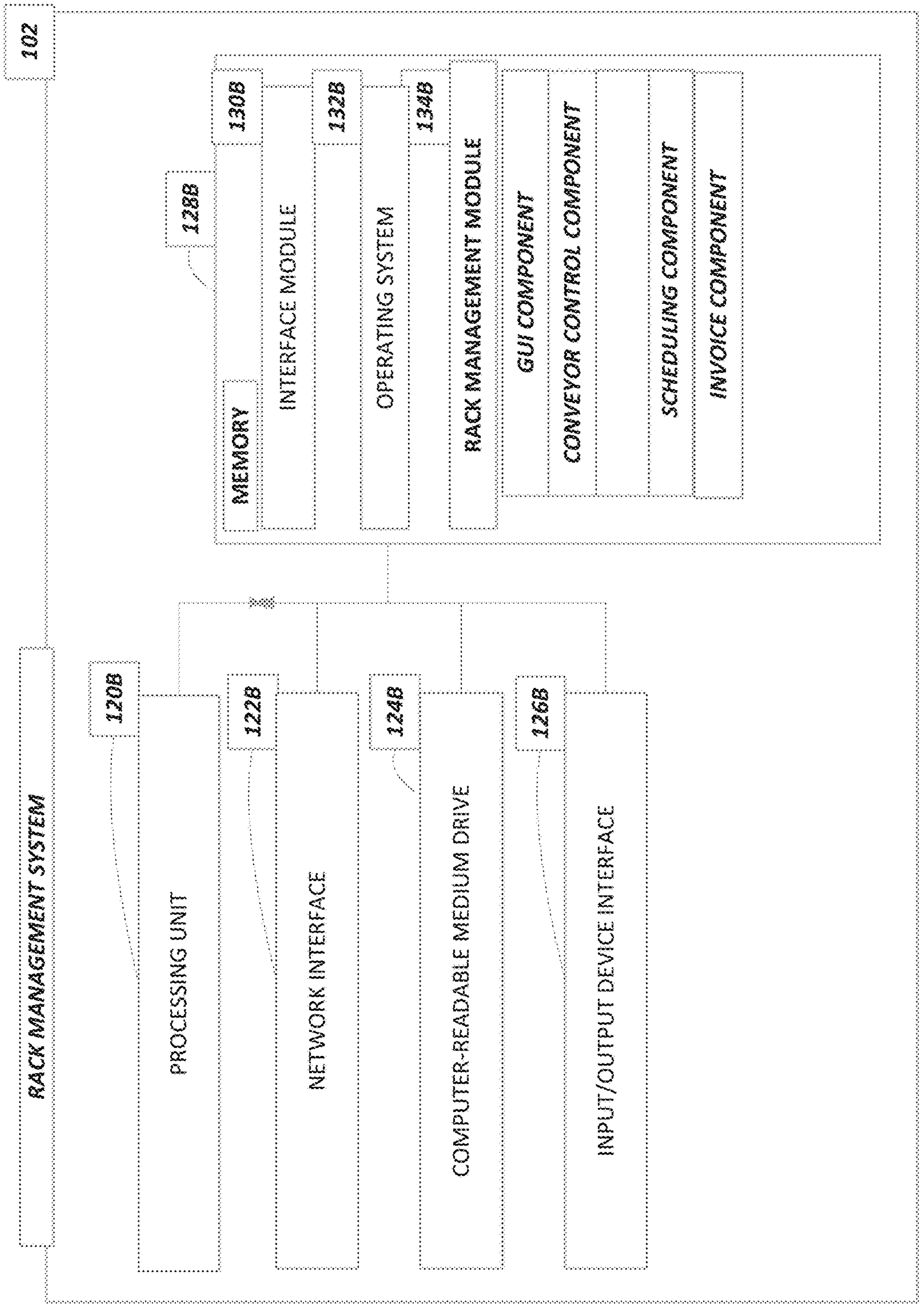
FIG. 1B illustrates an example architecture.

FIG. 1B is a block diagram illustrating an embodiment of example components of the example rack management system 102. The example rack management system 102 includes an arrangement of computer hardware and software components that may be used to implement aspects of the present disclosure. Those skilled in the art will appreciate that the example components may include more (or fewer) components than those depicted in FIG. 1B.

The rack management system 102 may include one or more processing units 120B (e.g., a programmable logic controller (PLC), a general purpose processor and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses. The network interface 122B may provide connectivity to and communications with one or more networks or computing systems (e.g., one or more of the systems and devices illustrated in FIG. 1A). The processing unit 120B may thus communicate information and instructions to and/or from other computing devices, systems, or services via a network. The processing unit 120B may also communicate to and from memory 124B and further provide output information via the input/output device interface 126B. The input/output device interface 126B may also accept input from one or more input devices, such as a keyboard, mouse, digital pen, touch screen, microphone, cameras (e.g., motion sensitive cameras), LIDAR sensors, occupancy detectors, pressure sensors, proximity sensors, temperature sensors, current sensors, voltage sensors, force and load sensors, level sensors vibration, limit switches, and motion sensors, humidity sensors, barcode readers, RFID readers, other sensors disclosed herein, and/or the like.

A programmable logic controller is configured to continuously monitor the state of input devices and makes decisions using a user specified program to control the state of output devices (e.g., energize or de-energize output devices connected to the PLC.). Output devices may include motor systems (e.g., motorized lifts, motorized conveyor systems, motorized doors, and/or the like), actuators, solenoids, relays, displays, light indicators, audible alarm/indicator systems, printers, and/or the like. The programmable logic controller may include a central processing unit, RAM and ROM/EEPROM, analog inputs (connected to an internal analog to digital convertor), analog outputs (from an internal digital to analog convertor), digital inputs/outputs, and/or the like. The programmable logic controller may be an integrated chip or may comprise one or more interconnected physically separate modules.

The programmable logic controller may be programmed using a Ladder Diagram, Sequential Function Charts, a Function Block Diagram, Structured Text, an Instruction List, and/or other programming techniques.

The memory 128B may store computer program instructions that the processing unit 120B may execute to implement one or more aspects of the present disclosure. The memory 120B generally includes RAM, ROM (and variants thereof, such as EEPROM), magnetic disc drives, optical disc drives, and/or other persistent or non-transitory computer-readable storage media. The memory 120B may store an operating system 132B that provides computer program instructions for use by the processing unit 120B in the general administration and operation of the rack management system 102, including its components. The operating system 132B may be a real time operating system (RTOS).

The memory 128B may store user account data, such as, for a given user, payment instrument data, home/business physical address, storage location physical address (which may be the address the rack structure where the user typically stores a vessel), electronic address(es) (e.g., email address, SMS/MMS address, other messaging service address, etc.), a unique user identifier, a password, one or more unique identifiers associated with the user's vessel(s) (e.g., an RFID identifier, a hull identification number, a government issued permanent vessel number, an automatically generated identifier, and/or other identifier), the vessel make, the vessel model, the vessel model year, the vessel dimensions (e.g., height, width (e.g., the beam or beam on the centerline), length.tc.) or a corresponding size classification (e.g., Class 1. Class 2, Class 3, etc.), weight, historical storage and retrieval patterns (e.g., the dates and times the user requested a retrieval or storage of the marine vessel), other user data described herein, and/or other related data.

Optionally, in addition or instead, the data may be stored remotely on a cloud-based or other networked data store. The account data may optionally be stored in a relational database, an SQL database, a NOSQL database, a hierarchical database, an object oriented database, a graph database, and/or other database type. Where a user has more than one vessel, some or all of the vessel related information discussed above may be stored in the user account for each vessel or may be stored in a separate account.

The memory 128B may include an interface module 130B. The interface module 130B may be configured to facilitate generating one or more interfaces through which a compatible computing device may send data to or receive data from the rack management module 134B.

The modules or components described above may also include additional modules or may be implemented by computing devices that may not be depicted in FIGS. 1A and 1B. For example, although the interface module 130B is identified in FIG. 1B as a single module, the module may be implemented by two or more modules and in a distributed manner. By way of further example, the processing unit 120B may include a PLC and a graphics processing unit (GPU). The system may offload compute-intensive portions of the applications to the GPU, while other code may run on the PLC. The GPU may include hundreds, or thousands of core processors configured to process tasks in parallel. The GPU may include high speed memory dedicated for graphics processing tasks. As another example, the systems described herein and their components can be implemented by network servers, application servers, cloud-base systems, database servers, combinations of the same, or the like, configured to facilitate data transmission to and from data stores, and other party systems via one or more networks. Accordingly, the depictions of the modules are illustrative in nature.

Figure 2A:
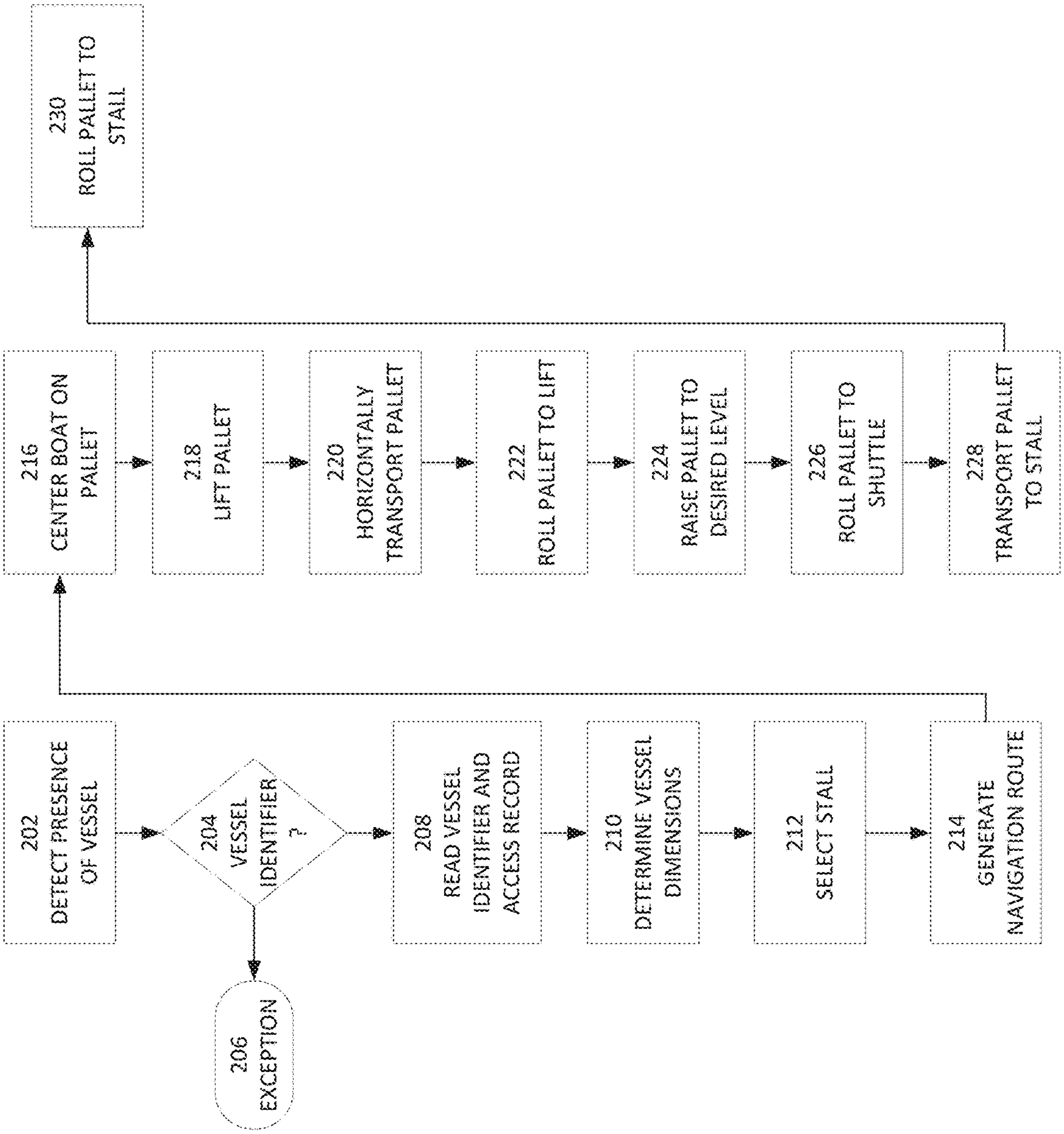
FIGS. 2A-2B illustrate example processes.
Figure 4:
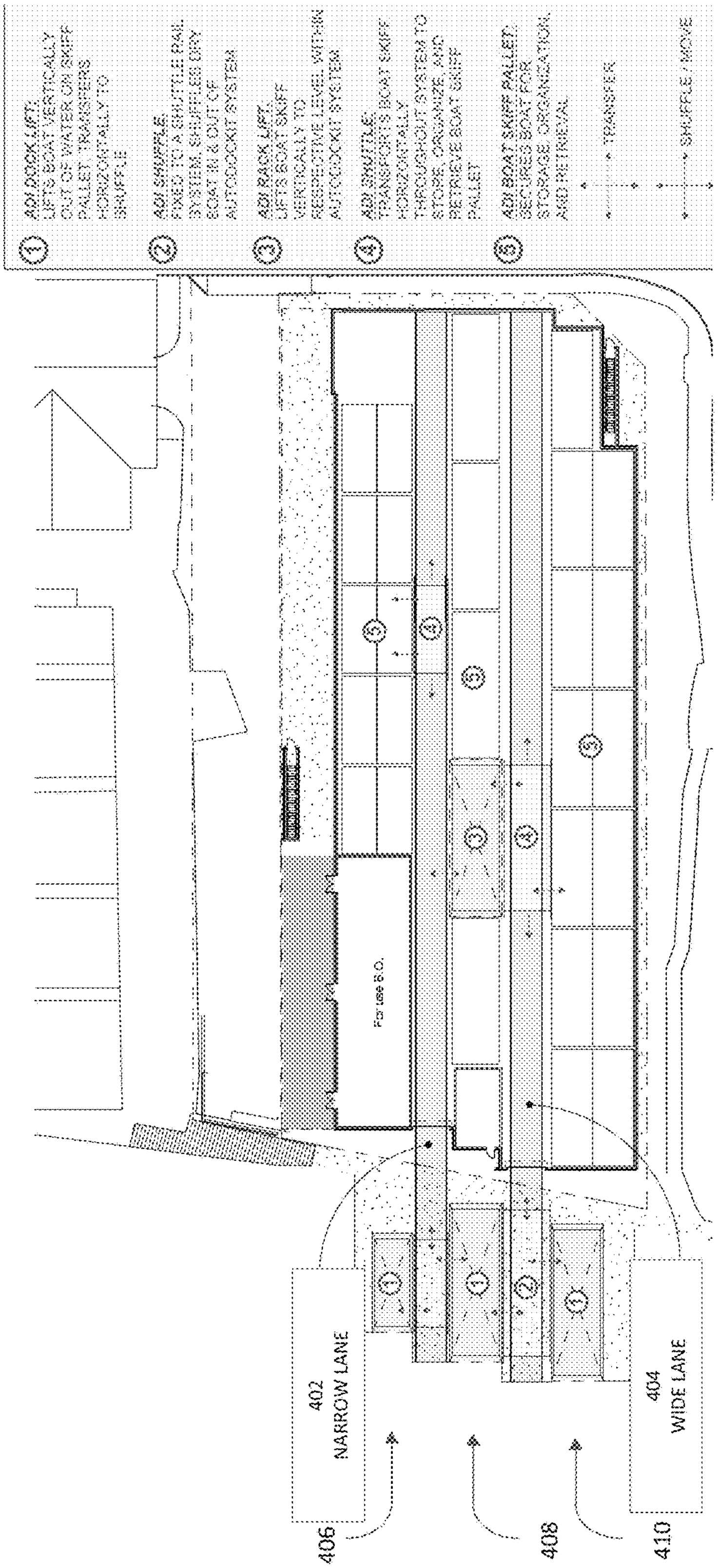
FIG. 4 illustrates an example rack storage facility architecture and functionality.

FIG. 2A illustrates an example vessel storage process for a rack storage facility (e.g., a multilevel vessel storage structure) that provides an automated vessel conveyance system. The process may be utilized using a computer system, such as the PLC discussed elsewhere herein. In the following example, vessels entering an automated vessel storage facility may be equipped with optical codes (e.g., QR codes printed on a sticker affixed to the vessel) or devices (e.g., RFID devices, such as passive or active RFID tags located on or within the vessel) that identify the vessel (e.g., via a unique vessel identifier), the user (e.g., via a unique user identifier), and/or that identify the storage facility that the user is authorized to store a vessel in (e.g., a unique storage facility identifier). FIG. 4 illustrates an example architecture of a rack storage facility.

At block 202, the process (which may be executed in whole or in part using the rack management system 102) may detect that a vessel has entered a dock slip using one or more sensors described herein. For example, referring to FIG. 4, the rack storage facility may include a plurality of dock slips 406, 408, 410 of different widths and lengths to accommodate different size vessels.

The user may exit the vessel and wait at the dock. A skiff pallet, lowered into the water prior to the vessel docking, may underlie the vessel. At block 204, a determination may be made as to whether a vessel identifier has been detected. For example, a camera may be utilized to determine if a valid vessel identifier (e.g., a one or two dimensional barcode, such as QR code, and/or plain text) is positioned on the vessel in a viewable location. By way of further example, an RFID reader may be used to determine if a RFID tag storing a valid vessel identifier is present on the vessel. If a valid vessel identifier is not detected, an exception process 206 may be performed. For example, an alert may be generated requesting human assistance. The alert may be provided as a visual alert, audible alert, and/or via an electronic communication (e.g., an alert provided via an email, text message, application alert, webpage, and/or otherwise). Optionally, the vessel storage process will not be performed in the absence of human intervention.

If a valid vessel identifier is read, at block 208, the read vessel identifier may be used to locate a matching record associated with the vessel identifier. At block 210, the vessel dimensions (e.g., the height width/beam, length) or a corresponding size classification (e.g., Class 1, Class 2, Class 3, etc.) may be accessed from the matching record. Optionally, to enhance safety and accuracy, one or more sensors (e.g., cameras, LIDAR systems, photoelectric sensors, and/or other sensors) may be utilized to capture images and/or other data that may indicate the vessel size, and the vessel size may be estimated. If the dimensions accessed from the record differ by more than a threshold amount from those estimated from the sensor data, optionally an exception condition may be indicated, and an alert may be generated requesting human assistance. The alert may be provided as a visual alert, audible alert, and/or via an electronic communication (e.g., an alert provided via an email, text message, application alert, webpage, and/or otherwise). Optionally, the vessel storage process will not be performed in the absence of human intervention.

Optionally, to further enhance safety, the process may utilize sensors (e.g., cameras, LIDAR systems, photoelectric sensors, infrared heat sensors, ultrasonic rangefinder sensor, millimeter wave radar, and/or other sensors) to determine whether a person is on board the vessel. Movement of the skiff pallet bearing the vessel may be inhibited until it is determined that no one is on the vessel. If such a determination cannot be made with a certain level of confidence, optionally an exception condition may be indicated, and an alert may be generated requesting human assistance. The alert may be provided as a visual alert, audible alert, and/or via an electronic communication (e.g., an alert provided via an email, text message, application alert, webpage, and/or otherwise). Optionally, the vessel storage process will not be performed in the absence of human intervention.

Other safety features may be provided. For example, if a sensor is detected to have failed (e.g., based on a failure to receive a sensor signal, or in response to detecting a sensor voltage or current outside of a specified range), an exception condition may be indicated, an alert generated, and movement of the skiff pallet bearing the vessel may be inhibited.

Assuming an exception condition has not occurred, at block 212 a storage stall within the rack structure is selected. For example, the stall may be selected based at least in part on the dimensions of the vessel (e.g., as determined from the accessed records or from the sensors) or a corresponding size classification (e.g., Class 1, Class 2, Class 3, etc.) to ensure the stall is of sufficient width, length, and/or height. At block 214, a navigation route from the dock slip to the selected bay is determined. The navigation route may be optimized for speed and/or to reduce equipment wear (e.g., to reduce the number of times the skiff pallet needs to be transferred to lifts or shuttles). The navigation route generation may also take into account the vessel's dimensions and/or size classification. For example, the system may select route lanes 402, 404 that are wide enough and/or have shuttles large enough for the vessel to fit, where different lanes may have different widths.

At block 216, the vessel may be centered on the skiff pallet positioned beneath the vessel (although this may have been performed earlier). For example, as similarly discussed elsewhere herein, the vessel may be centered in the slip using a positioning mechanism, such as foam or rubber rollers positioned on multiple pairs of arms on either side of the marine vessel. For example, a given arm may have a vertically oriented roller that comes into contact with the vessel. The skiff pallet may be resting on a lift positioned beneath the skiff pallet. The arms may be motorized and activated to perform the centering operation. The arms may be retracted once the boat is centered over the skiff pallet cradle.

At block 218, the lift, with the skiff pallet and vessel thereon, may be lifted from the water with the boat positioned on a pallet cradle, such as a credible discussed elsewhere herein. For example, the lift (see, e.g., FIG. 4, lifts 1) may be lifted to rack storage entry elevation (e.g., using a rail lift system, a sheave/pulley and counterweight system, or other lift mechanism), a hydraulic system, a vacuum system, a linear motor, or otherwise.

At block 220, the skiff pallet may be conveyed (e.g., rolled) off the lift onto a shuttle (e.g., where the shuttle may be to the left of the right of the lift, see FIG. 4, shuttles 2). At block 220, the shuttle (with the skiff pallet and cradled vessel thereon) may be horizontally transported (e.g., using a motorized conveyor system) through the rack structure entryway to the interior of the rack structure. If the selected stall is at a different level, the shuttle (with the skiff pallet and cradled vessel thereon) may be transported to a lift (see FIG. 4, lifts 3) identified in the navigation route within the rack structure. At block 222, the skiff pallet is conveyed (e.g., rolled) onto the lift. At block 224, the lift transports the vessel to the level at which the selected stall is located in accordance with the navigation route. At block 226, the skiff pallet is conveyed (e.g., rolled) onto a shuttle (see FIG. 4, shuttles 4) at the desired level. At block 228, the shuttle (via a conveyor) transports the skiff pallet and the vessel to the selected slot (which may be to the right or left of the shuttle) in accordance with the navigation route (see FIG. 4, stalls 5). At block 230, the skiff pallet with the vessel is conveyed (e.g., rolled) off the shuttle to the selected stall. Optionally, prior to conveying (e.g., rolling) the skiff pallet to the selected stall, one or more sensors may be utilized to verify that the stall is not occupied. For example, a camera or a pressure sensor in the stall may be used to verify that the stall is unoccupied. If the stall is occupied, an exception condition may be indicated, an alert generated, and movement of the skiff pallet bearing the vessel to the stall may be inhibited. Optionally, a different stall may be selected to receive the skiff pallet and vessel.

Figure 3A:
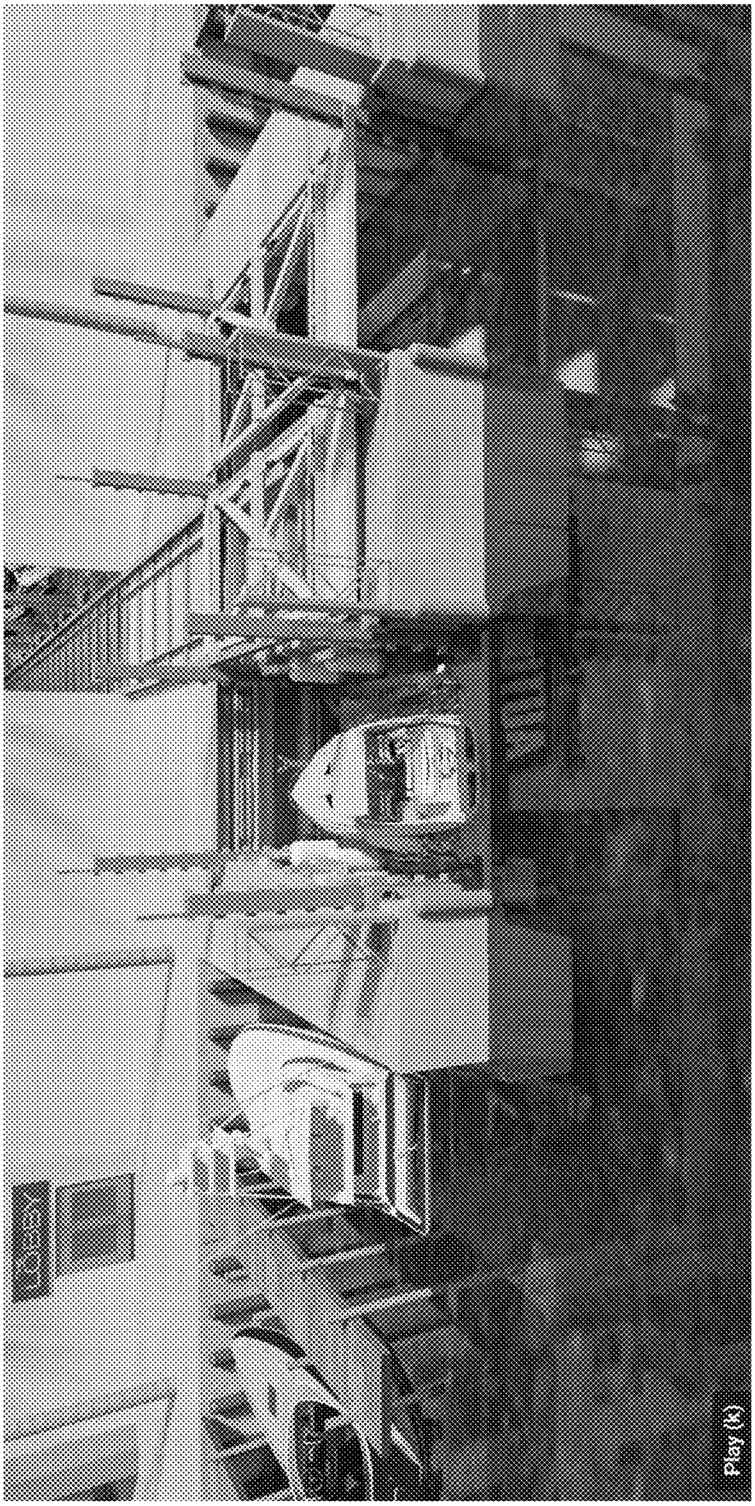
FIGS. 3A-3J illustrate various aspects of an example vessel transport and storage system.
Figure 3B:
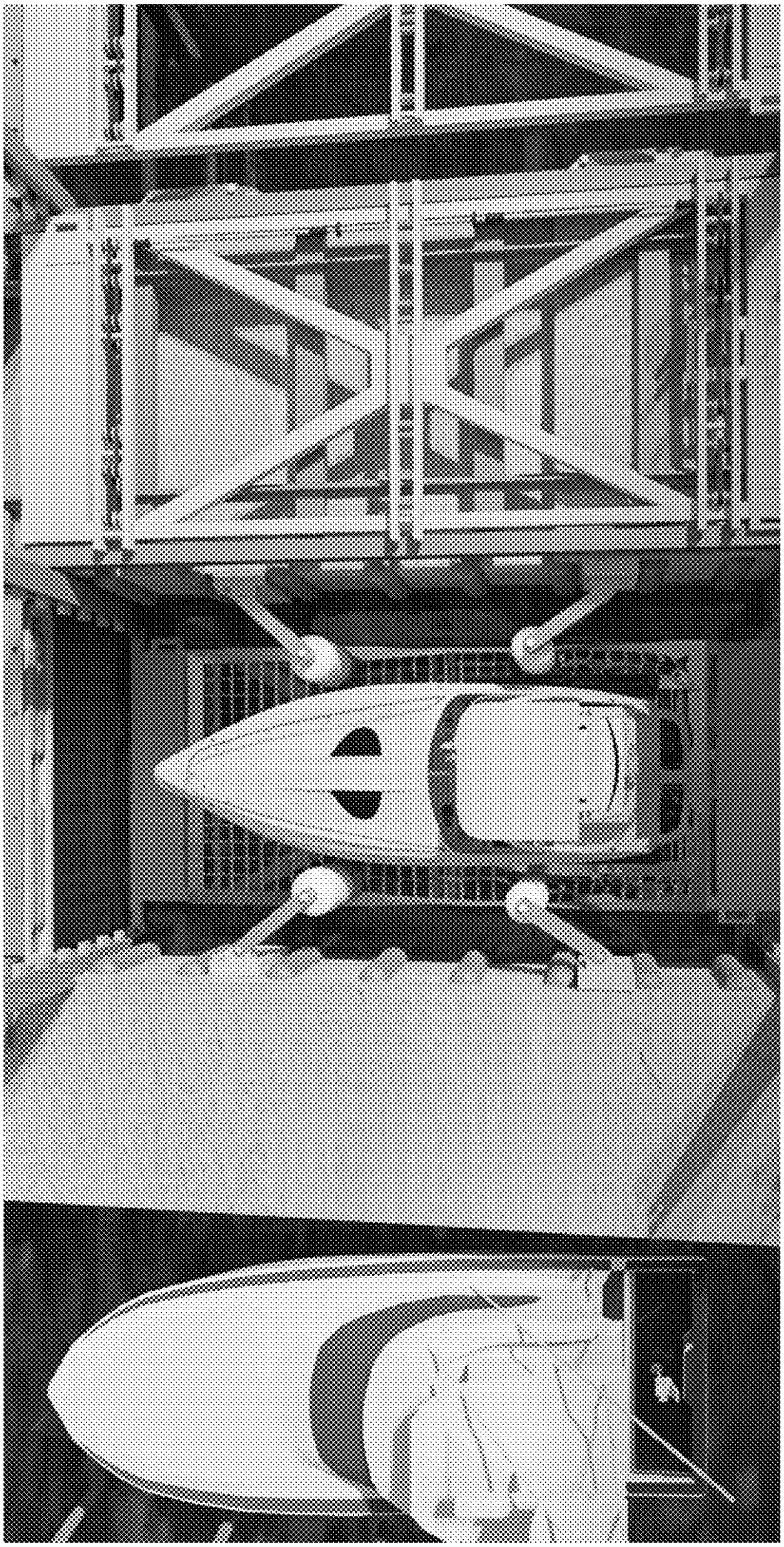
Figure 3C:

Referring to FIGS. 3A-3J illustrate example models of the rack storage facility. FIG. 3A illustrates an example vessel positioned in a dock slip with a lift and skiff pallet positioned in the water beneath the vessel. FIG. 3B illustrates two arms on either side of the vessel with vertical rollers positioned parallel to the vessel. The arms may be rotated via motors so that the vertical rollers contact the vessel hall and center the vessel over the skiff pallet cradle. FIG. 3C illustrates the lift, pallet, and vessel being transported out of the water.

Figure 3D:
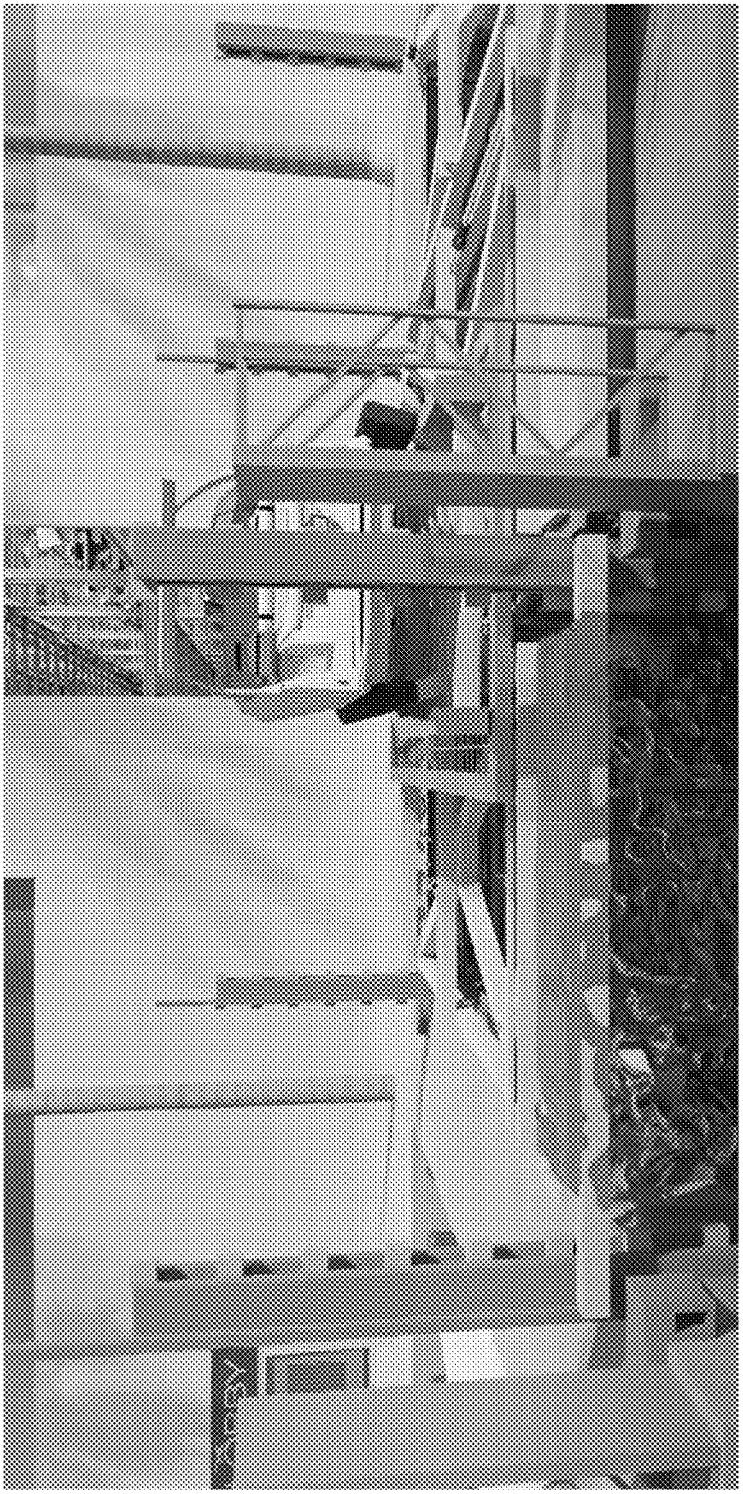
Figure 3E:
Figure 3F:
Figure 3G:
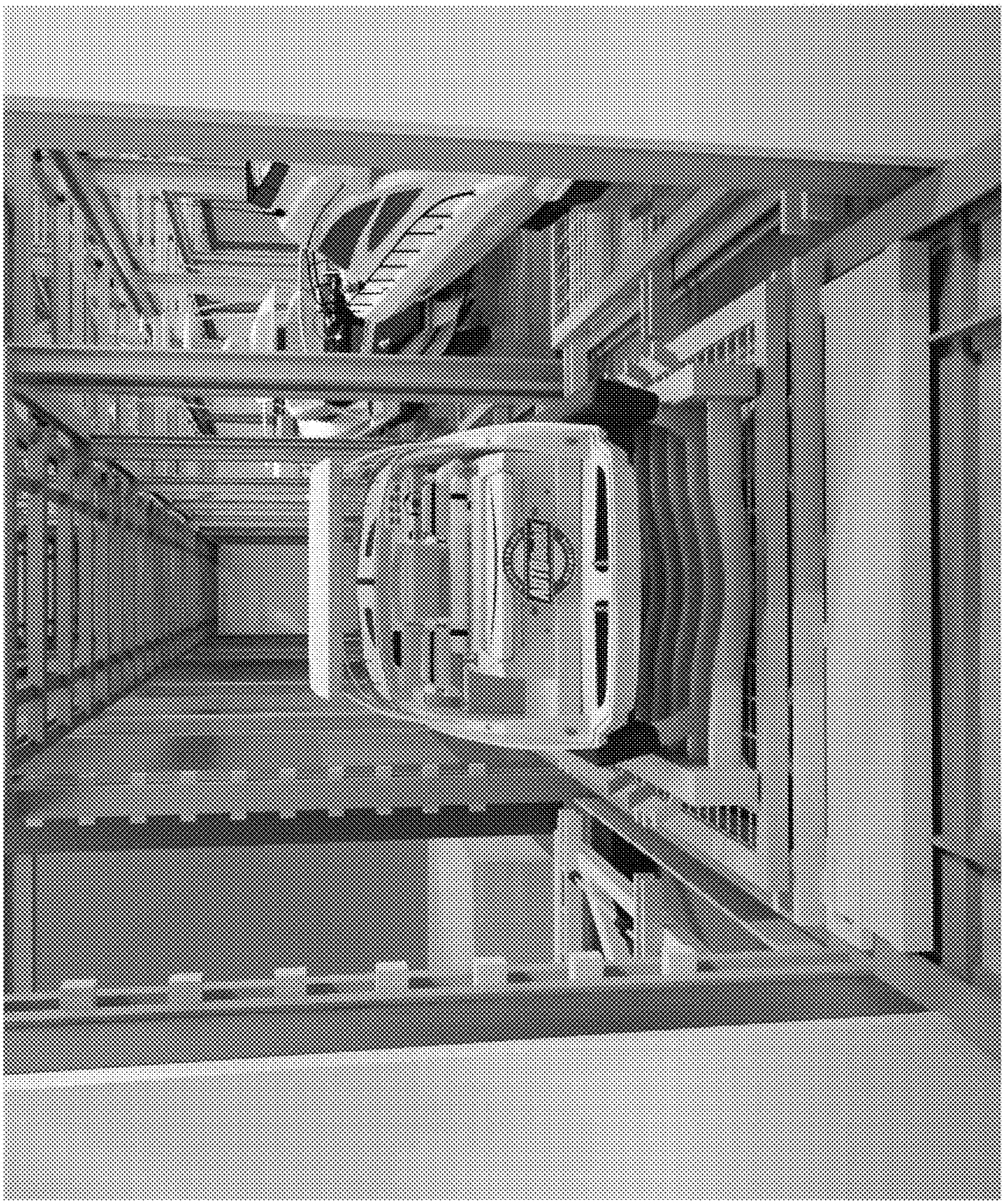
Figure 3H:
Figure 3I:
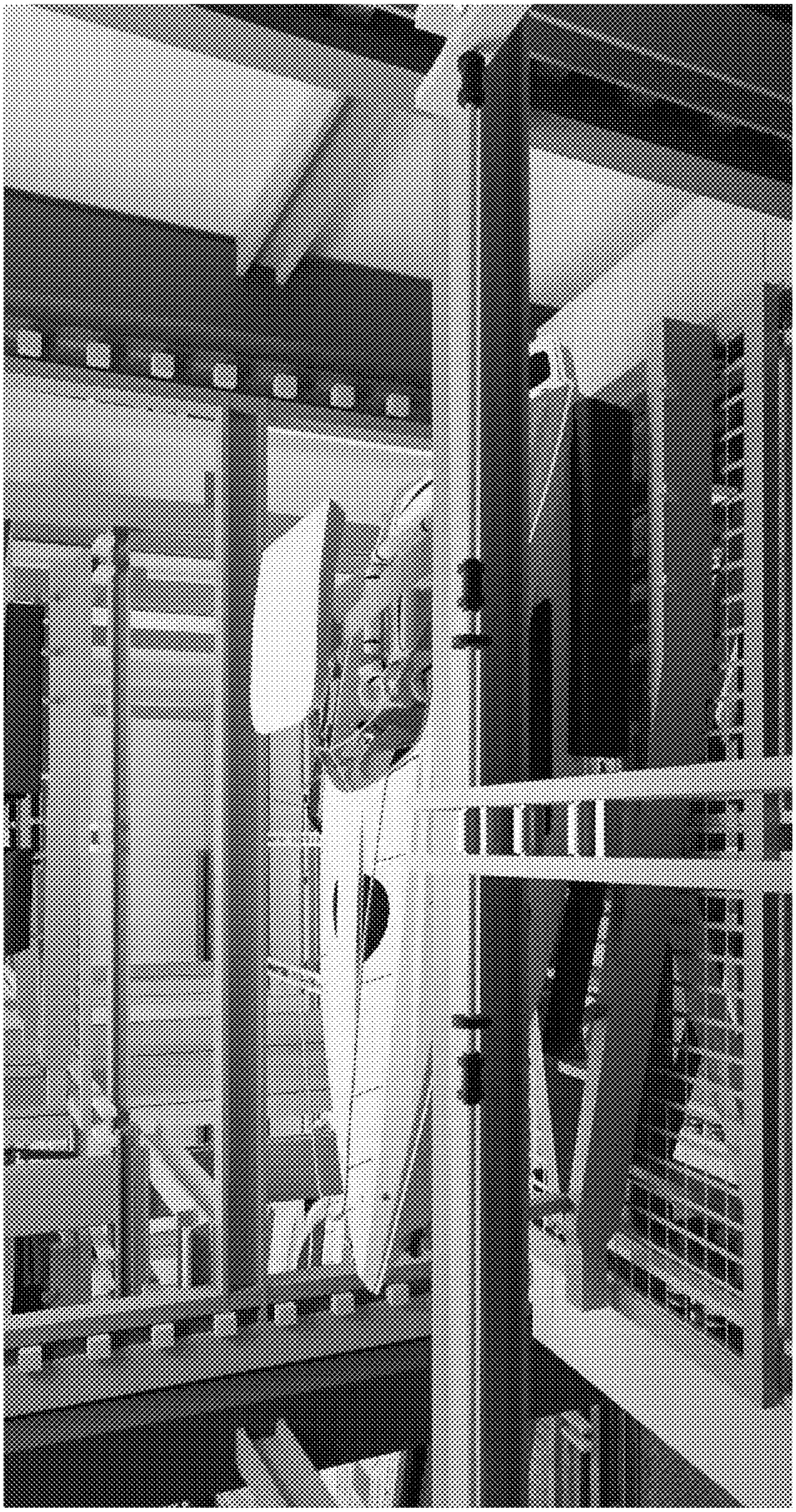
Figure 3J:
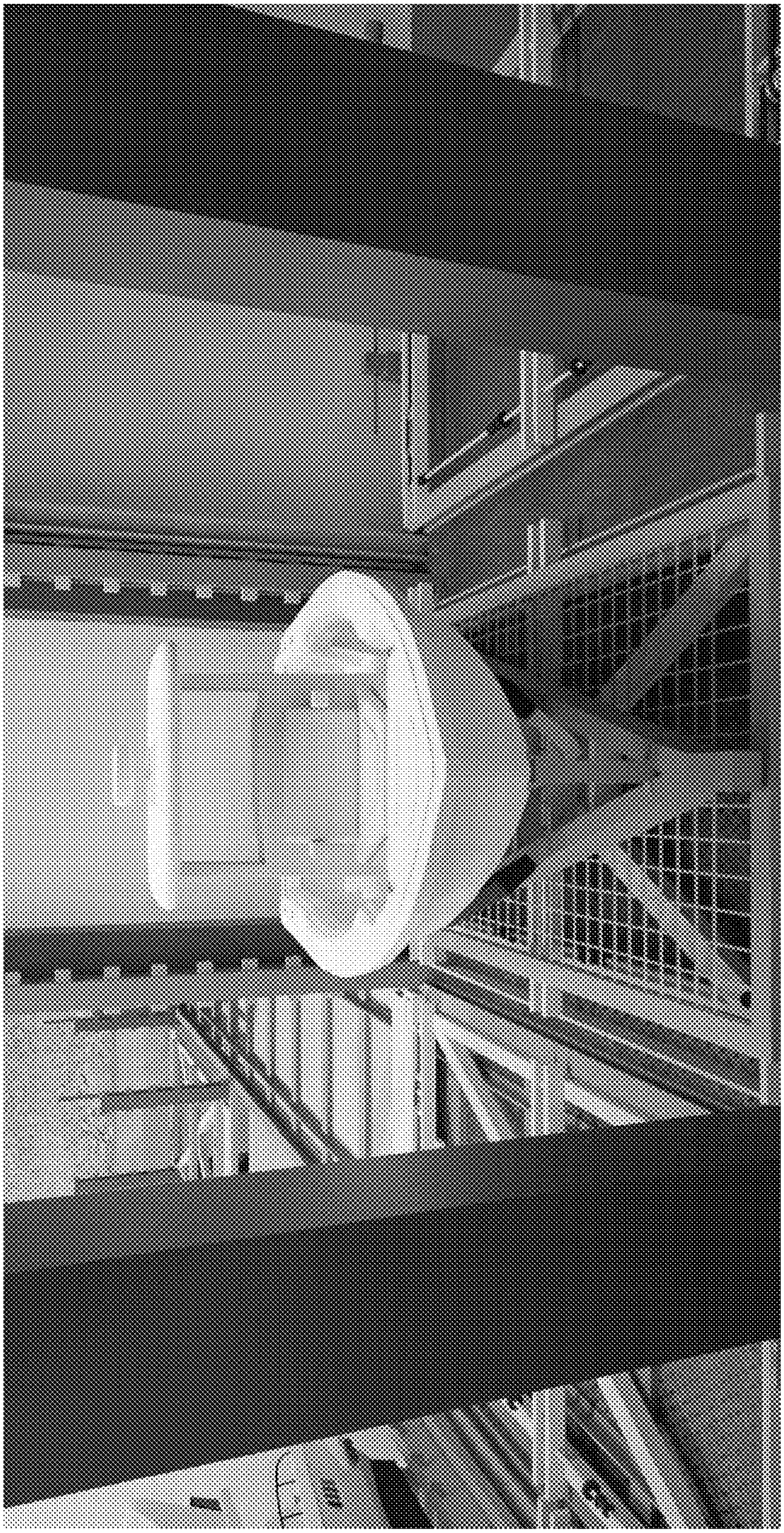

FIG. 3D illustrates the skiff pallet (and the vessel thereon) being conveyed (e.g., rolled) from the lift onto a shuttle. FIG. 3E illustrates the shuttle (and the skiff pallet and vessel thereon) being conveyed through the entryway of the rack storage facility. FIG. 3F illustrates the shuttle (and the skiff pallet and vessel thereon) being horizontally transported via a rail system within the rack storage facility. FIG. 3G illustrates the shuttle (and the skiff pallet and the vessel thereon) being horizontally transported via a rail system down a lane between storage stalls. FIG. 3H illustrates the skiff pallet and the vessel thereon being conveyed (e.g., rolled) onto a lift. FIG. 3I illustrates the skiff pallet and the vessel thereon being raised by the lift from one level to another. FIG. 3J illustrates the skiff pallet, with the boat cradled thereon, positioned in a stall for storage.

It is understood that different navigation routes may involve different combinations of shuttles and lifts than those in the foregoing example.

Figure 2B:
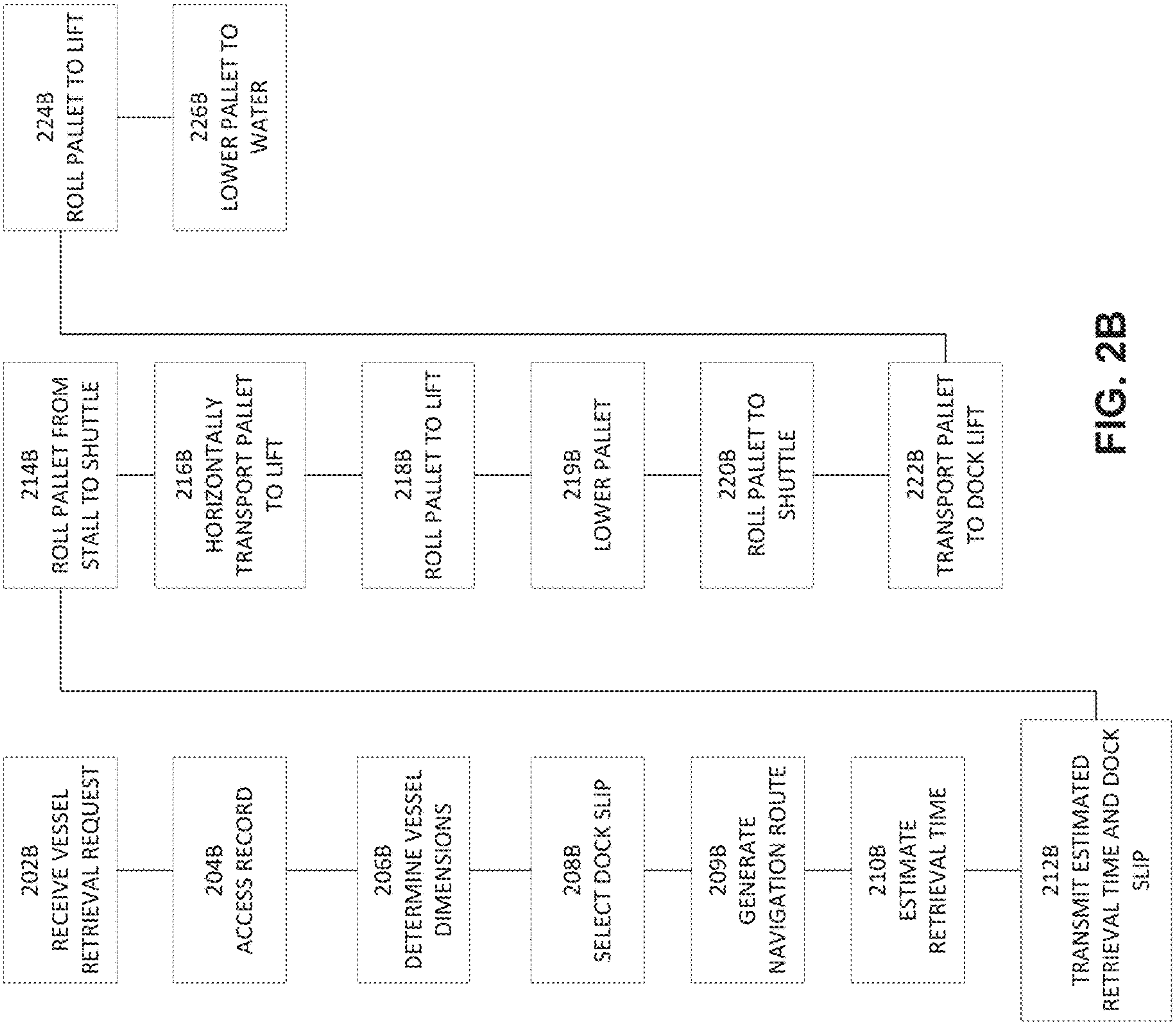

FIG. 2B illustrates an example vessel retrieval process for a rack storage facility (e.g., a multilevel vessel storage structure) that provides an automated vessel conveyance system. The process may be utilized using a computer system, such as the PLC discussed elsewhere herein. The process may be optionally utilized to retrieve vessels sored using the process illustrated in FIG. 2A.

At block 202B, a retrieval request is received (e.g., at a rack management system) for a marine vessel (e.g., from a user, such as an owner or other authorized user of the vessel). For example, the retrieval request may have been received via a user interface presented by a dedicated application downloaded to a user device, by a user interface presented by a webpage hosted on a webserver, via text message from a mobile user device, via email, or via a phone call. The request may include an identifier (a user provided identifier, a hull identification number, a government issued permanent vessel number, an identifier previously generated and provided to the user, and/or other identifier), associated with the requester and/or the vessel. For example, if the request is provided via a dedicated application, the dedicated application may automatically transmit the identifier in association with the request. If the user has more than one vessel stored at the rack storage facility, the user interface may automatically be populated with vessel identifiers (which may be nicknames assigned by the user), and the user can select which vessel is to be retrieved. The request will then include the identifier associated with the selected vessel. The request may optionally specify the rack facility that the vessel is stored at.

At lock 204B, the record associated with the identifier may be accessed from memory. As similarly discussed elsewhere herein, the record may be an account record that includes the vessel identifier, a user name, a marine vessel type (e.g., motor, sail, multihull, etc.), marine vessel dimensions (e.g., width, length, height) and/or a corresponding size classification (e.g., Class 1, Class 2, Class 3, etc.), marine vessel weight, user authentication data, user contact information (e.g., mobile phone number, email address, etc.), payment information, historical vessel retrieval and storage data, current storage location (e.g., the rack structure address or other identifier, and a stall identifier (e.g., an alphanumeric identifier)), other user and vessel data disclosed herein, and/or the like At block 206B, the vessel dimensions (e.g., the height width/beam, length) and/or size classification may be accessed from the associated record.

At block 208B, a dock slip to which the vessel is to be deployed for retrieval by the user is selected. The selection may be based on the vessel dimensions and/or size classification, which slips are in current use or are already scheduled for use, and/or other data.

At block 209B, a navigation route is generated from the stall at which the vessel is stored (as determined from the accessed record or other source) to the selected dock slip. The navigation route may be optimized for speed and/or to reduce equipment wear (e.g., to reduce the number of times the skiff pallet needs to be transferred to lifts or shuttles). The navigation route generation may also take into account the vessel's dimensions and/or size classification. For example, the system may select route lanes that are wide enough and/or have shuttles large enough for the vessel to fit.

At block 210B, the estimated retrieval time is calculated. The retrieval time estimate may be based on the speed of the shuttles and lifts, the horizontal distance that will be traversed by the shuttles in the navigation route, the vertical distance that will be traversed by the lifts in the navigation route, the number of transfers of the vessel pallet (and the vessel cradled thereon) to and from shuttles and lifts, the estimated time of such transfers, and if the transport of the vessel will need to be paused during the route for an estimated amount of time (e.g., due to the use of a lift or shuttle for the transport of another vessel).

At block 212B, the estimated retrieval time and/or dock slip identifier are electronically transmitted to the user. Thus, the user will know when the vessel will be available to the user and at what dock slip the user may find the vessel.

At block 214B, the skiff pallet, with the vessel cradled thereon, is conveyed (e.g., rolled) onto a shuttle identified in the navigation route. At block 216B, the skiff pallet, with the vessel cradled thereon, is horizontally transported via a conveyor system (e.g., a rail system) to a lift. At block 218B, the skiff pallet, with the vessel cradled thereon, is conveyed (e.g., rolled) onto the lift. At block 219B, the lift transports the skiff pallet, with the vessel cradled thereon, to a lower level of the structure.

At block 220B, the skiff pallet, with the vessel cradled thereon, is conveyed (e.g., rolled) onto another shuttle. At block 222B, the skiff pallet, with the vessel cradled thereon, to a dock lift. At block 224B, the skiff pallet, with the vessel cradled thereon, is conveyed (e.g., rolled) onto the dock lift. At block 226B, the dock lift lowers the skiff pallet, with the vessel cradled thereon, to the selected dock slip, and placed in water.

It is understood that different navigation routes may involve different combinations of shuttles and lifts than those in the foregoing example.

It is understood that although the foregoing description may relate to marine vessels, the disclosed methods and systems may be used for other movable objects that need to be periodically stored and retrieved, such as shipping or storage containers.

Thus, technical solutions are disclosed that address challenges are safely storing and retrieving marine vessels, while reducing environmental impact, land usage, and damage to such marine vessels.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may." "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:

at least one processing device;

non-transitory memory that stores programmatic instructions that when executed by the at least one processing device cause the system to perform operations comprising:

determining that a marine vessel is positioned in a slip;

optically or electronically reading an identifier on the marine vessel;

using the identifier to access data stored in memory corresponding to the marine vessel;

based at least in part on the accessed data, selecting a storage stall;

generating a navigation route comprising a plurality of shuttles, configured to horizontally transport pallets via lanes, and a plurality of lifts configured to vertically transport pallets;

causing the marine vessel to be positioned on a skiff pallet located in water;

causing a first lift to raise the skiff pallet from the water, with the marine vessel positioned on a pallet cradle;

causing the skiff pallet, with the marine vessel positioned on the skiff pallet cradle, to be rolled from the first lift to a first shuttle, in accordance with the navigation route;

causing the first shuttle to horizontally transport, on a first conveyor system, the skiff pallet, with the marine vessel positioned on the skiff pallet cradle, through an entryway of a rack structure facility to a second lift at a first level, the rack storage facility comprising a building with multiple levels of storage stalls therein, wherein a given level comprises one or more lanes positioned adjacent to at least one row of storage stalls;

causing the skiff pallet, with the marine vessel positioned on the skiff pallet cradle, to be rolled from the first shuttle to the second lift;

using the second lift to raise the skiff pallet, with the marine vessel positioned on the skiff pallet cradle, to a second level;

causing the skiff pallet, with the marine vessel positioned on the skiff pallet cradle, to be rolled from the second lift to a second shuttle;

causing the second shuttle to horizontally transport, on a second conveyor system at the second level, the skiff pallet, with the marine vessel positioned on the skiff pallet cradle, to the storage stall.

2. The system as defined in claim 1, wherein the identifier on the marine vessel is encoded in an optical code.

3. The system as defined in claim 1, wherein the first conveyor system comprises a rail-based transport system.

4. The system as defined in claim 1, wherein the skiff pallet comprises an open grate structure.

5. The system as defined in claim 1, the operations further comprising:

receiving an electronic request for retrieval of a second marine vessel, the request comprising an identifier associated with a user and/or second marine vessel;

accessing a record indicating a storage stall at which the second marine vessel is stored;

selecting a dock slip at which the second marine vessel is to be deployed;

generating a navigation route from the storage stall at which the second marine vessel is stored to the selected dock slip, the navigation route comprising at least one lift and at least one shuttle;

transporting the second marine vessel from the storage stall at which the second marine vessel is stored to the selected dock slip in accordance with the generated navigation route from the storage stall at which the second marine vessel is stored to the selected dock slip.

6. The system as defined in claim 1, the operations further comprising using a plurality of positioning arms positioned on either side of the marine vessel to position the marine vessel on the skiff pallet located in water.

7. The system as defined in claim 1, wherein the building comprises anchor bolts and/or tie-down straps to secure the building to a foundation, reinforced concrete walls and/or a steel frame configured to resist uplift and damage from a hurricane.

8. The system as defined in claim 1, wherein a first level comprises at least two lanes of different widths configured for different width marine vessels.

9. The system as defined in claim 1, wherein the storage stall is selected based at least in part on size information related to the marine vessel.

10. The system as defined in claim 1, wherein the navigation route is generated using size information related to the marine vessel.

11. A computer implemented method, the method comprising:

determining that a marine vessel is positioned in a slip;

optically or electronically reading an identifier on the marine vessel;

using the identifier to access data stored in memory corresponding to the marine vessel;

based at least in part on the accessed data, selecting a storage stall;

generating a navigation route comprising one or more shuttles, configured to horizontally transport pallets, and one or more lifts configured to vertically transport pallets;

causing the marine vessel to be positioned on a pallet located in water;

causing a first lift to raise the skiff pallet from the water, with the marine vessel positioned on a pallet cradle;

causing the skiff pallet, with the marine vessel positioned on the skiff pallet cradle, to be transferred from the first lift to a first shuttle, in accordance with the navigation route;

causing the first shuttle to horizontally transport, on a first conveyor system, the skiff pallet, with the marine vessel positioned on the skiff pallet cradle, through an entryway of a rack structure facility to a second lift at a first level, the rack storage facility comprising a building with multiple levels of storage stalls therein, wherein a given level comprises one or more lanes positioned adjacent to at least one row of storage stalls; and causing the skiff pallet, with the marine vessel positioned on the skiff pallet cradle, to be transported to the storage stall.

12. The computer implemented method as defined in claim 11, wherein the identifier on the marine vessel is encoded in an optical code.

13. The computer implemented method as defined in claim 11, wherein the first conveyor system comprises a rail-based transport system.

14. The computer implemented method as defined in claim 11, wherein the skiff pallet comprises an open grate structure.

15. The computer implemented method as defined in claim 11, the method further comprising:

receiving an electronic request for retrieval of a second marine vessel, the request comprising an identifier associated with a user and/or second marine vessel;

accessing a record indicating a storage stall at which the second marine vessel is stored;

selecting a dock slip at which the second marine vessel is to be deployed;

generating a navigation route from the storage stall at which the second marine vessel is stored to the selected dock slip, the navigation route comprising at least one lift and at least one shuttle;

transporting the second marine vessel from the storage stall at which the second marine vessel is stored to the selected dock slip in accordance with the generated navigation route from the storage stall at which the second marine vessel is stored to the selected dock slip.

16. The computer implemented method as defined in claim 11, the method further comprising using a plurality of positioning arms positioned on either side of the marine vessel to position the marine vessel on the skiff pallet located in water.

17. The computer implemented method as defined in claim 11, wherein a first level comprises at least two lanes of different widths configured for different width marine vessels, and the generated navigation route is generated to select a lane wide enough for the marine vessel.

18. The computer implemented method as defined in claim 11, wherein the storage stall is selected based at least in part on size information related to the marine vessel.

19. The computer implemented method as defined in claim 11, wherein the navigation route is generated using size information related to the marine vessel.

20. The computer implemented method as defined in claim 11, wherein causing the skiff pallet, with the marine vessel positioned on the skiff pallet cradle, to be transferred from the first lift to the first shuttle, further comprising causing the skiff pallet to be rolled from the first lift to the first shuttle.

* * * * *